G. SEIBT.
MEANS FOR MEASURING OR CONTROLLING THE FREQUENCY OR WAVE LENGTH OF ALTERNATING CURRENTS.
APPLICATION FILED AUG. 2, 1912.

1,070,376.

Patented Aug. 12, 1913.

Witnesses:
Henry Hasper,

Inventor:
Georg Seibt

G. SEIBT.
MEANS FOR MEASURING OR CONTROLLING THE FREQUENCY OR WAVE LENGTH OF ALTERNATING CURRENTS.
APPLICATION FILED AUG. 2, 1912.
1,070,376.
Patented Aug. 12, 1913.
2 SHEETS—SHEET 2.
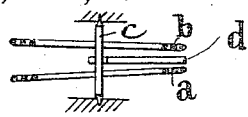
Fig. 8.
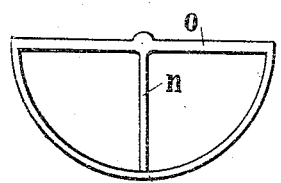
Fig. 9.
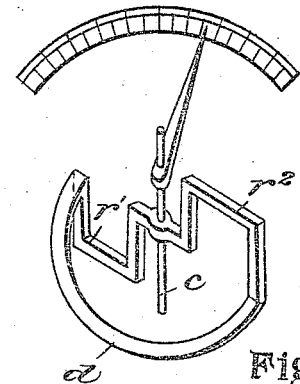
Fig. 12.
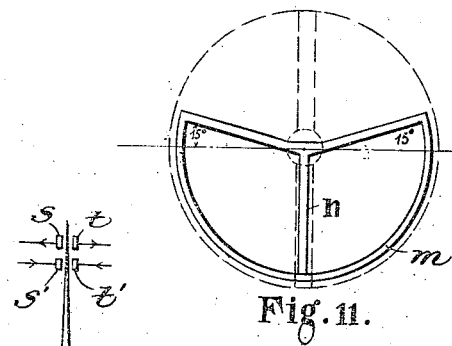
Fig. 11.
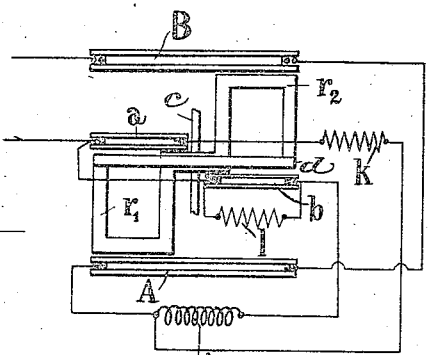
Fig. 13.
Fig. 10.
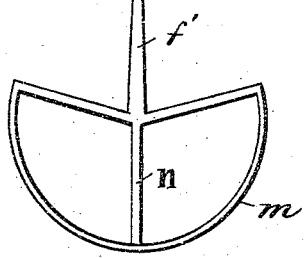
Fig. 15.
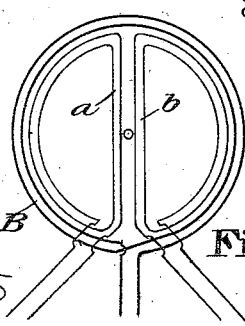
Fig. 16.
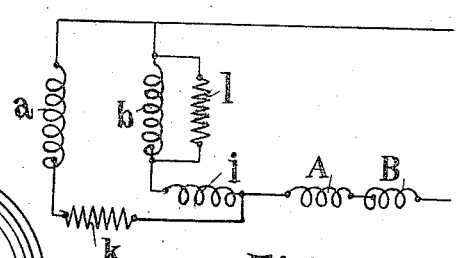
Fig. 14.
Witnesses:
Henry Hasper
Woldemar Haupt
Inventor,
Georg Seibt

UNITED STATES PATENT OFFICE.

GEORG SEIBT, OF SCHÖNEBERG, NEAR BERLIN, GERMANY.

MEANS FOR MEASURING OR CONTROLLING THE FREQUENCY OR WAVE LENGTH OF ALTERNATING CURRENTS.

1,070,376.   Specification of Letters Patent.   Patented Aug. 12, 1913.

Application filed August 2, 1912. Serial No. 712,938.

*To all whom it may concern:*

Be it known that I, GEORG SEIBT, a subject of the German Emperor, and resident of Schöneberg, near Berlin, Germany, have invented certain new and useful Means for Measuring or Controlling the Frequency or Wave Length of Alternating Currents, of which the following is a specification.

My invention relates to direct reading instruments for measuring the frequency or wave length of alternating currents of the kind in which the movable part of the instrument receives its energy from fixed coils by induction and is substantially free from the influence of any elastic forces.

The object of the invention is to provide an instrument of the kind above referred to which shall be more sensitive than those hitherto proposed.

In the instrument constructed according to the present invention the movable part is inductively acted upon by the fields of fixed coils acting in opposite directions and is shaped and arranged relatively to the axis of the instrument in such a manner that of all the planes containing this axis only one divides the armature into two symmetrical parts when the same is on or assumes a definite position, all the other planes dividing it into unequal parts.

Figure 1:
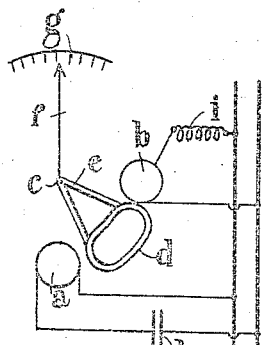
Figure 5:
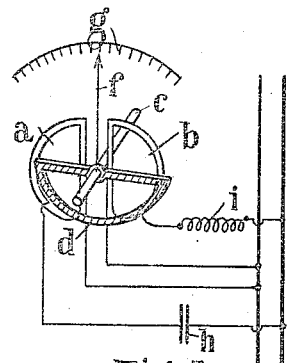
Figure 3:
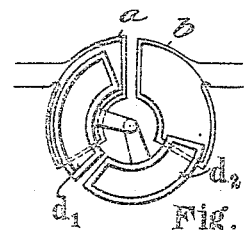
Figure 4:
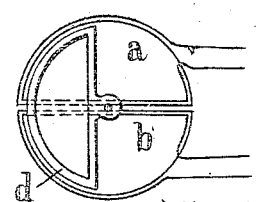
Figure 7:
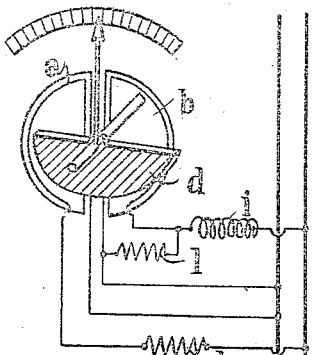
Figure 6:
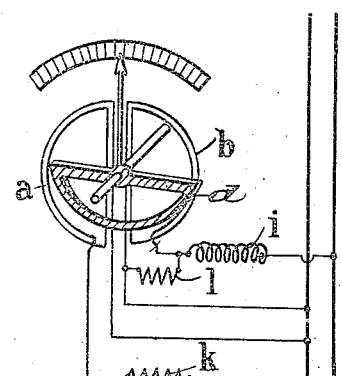

Figures 1 to 16 of the accompanying drawings illustrate diagrammatically and by way of example various modes of carrying out the invention into effect. Fig. 1 is a plan view, and Fig. 2 a front elevation of one form of my invention; Fig. 3 is a diagrammatic plan view of another form of my invention; Fig. 4 is a plan, with parts indicated in perspective, and Fig. 5 is a partial plan, of still another form of my invention; Figs. 6 and 7 are views similar to Fig. 4, showing two further forms of my invention; Fig. 8 is an elevation, with parts in section, illustrating a further construction embodying my invention; Fig. 9 is a plan view showing one form of armature suitable for use in my invention; Fig. 10 shows, upon an enlarged scale, the central rib of the armature shown in Fig. 9; Fig. 11 is a plan view of another form of armature; Fig. 12 is a perspective view of still another form of armature, with its pointer and scale; Fig. 13 is a side elevation, Fig. 14 a diagram of circuits, and Fig. 16 a plan view of the form of my invention employing the armature shown in Fig. 12; and Fig. 15 is a plan view of an armature and of a circuit-closer controlled thereby.

Figure 2:
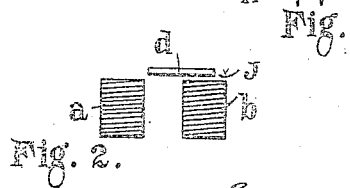

Referring to Figs. 1 and 2 $a$ and $b$ are two fixed coils arranged approximately 90° apart around the axis $c$ of the instrument, $d$ is a movable armature which consists of a piece of metal closed in itself or of a number of short circuited windings and is mounted on a frame $e$ arranged to rotate together with the armature $d$ around the axis $c$ and $f$ is an index or pointer secured to the frame $e$ and arranged to move in front of a graduated scale $g$. The armature $d$, the geometrical axis of which is approximately parallel to the axes of the coils $a$ and $b$, has the tendency to move under the influence of one of the coils in one direction and under the influence of the other coil in the opposite direction, the stationary position of the armature being determined by the relation between the fields produced by the coils $a$ and $b$. The variation of the fields or of the currents with the frequency may be obtained in various ways, such as by connecting the coil $a$ to the circuit the frequency of which is to be determined through a condenser $h$, and the coil $b$ through a self induction $i$. This form of construction permits of arranging the armature $d$ as close as possible to the fixed coils $a$ and $b$ thereby obtaining a more or less strong mutual effect depending upon the distance $j$ between the plane of the armature and the plane in which the ends of the fixed coils are arranged.

The sensitiveness of the instrument and the operative range of the graduated scale may be increased by making the surface inclosed by the armature as well as the surface inclosed by each of the fixed coils $a$ and $b$, angularly measured, greater than 90°. Two forms of construction of this type are illustrated in Figs. 3, 4 and 5. Fig. 3 which shows an arrangement in which the surfaces of the armature and fixed coils are, angularly measured relatively to the axis of the instrument, greater than 90° and in which the armature is split into two parts $d'$ and $d^2$ illustrates a case in which the maximum angle of deviation is theoretically 120°, the maximum angle utilized in practice being, however, about 60° only, since beyond this angle the forces become too small and the indications of the instrument are rendered inaccurate. The arrangement shown in Figs. 4 and 5 in which the surfaces of the armature and fixed coils are, angularly measured relatively to the axis of the instrument about 180° wide is still more sensitive, the maximum theoretical angle of deviation reaching 180° and the maximum angle used in practice about 110°.

An interesting phenomenon which has been observed in connection with the arrangement shown in Fig. 4 may now be referred to.

If the coils $a$ and $b$ in the arrangement shown in Fig. 4 are connected in such a manner that their fields have one and the same direction and are in phase with each other the armature turns toward the field of the coil carrying the smaller current and comes to lie entirely in this field with the index thrown against one end of the graduated scale. If the fields of the two fixed coils are equal to each other the resulting force acting upon the movable armature is *nil* independently of the position of the latter, the consequence being that under these conditions the instrument has no definite position of equilibrium, the movable armature being so to say in a "floating" state.

The occurrence of the phenomenon above referred to, which takes place in spite of the fact that very strong currents are flowing at the same time through the movable armature, may render the apparatus practically useless if no means were provided for avoiding it. Let us for instance suppose that the instrument is employed for measuring high frequency currents and bear in mind that the phenomenon is caused by the relation between the phases of the fields and not by the relation between the phases of the currents. If the condenser $h$ is made so small that its alternating current resistance is greater than that of the coil $a$ then the currents of the coils $a$ and $b$ will have a phase displacement of 180°. It is not however certain whether the fields will have the same displacement as the currents, but since this point is determined by the sense in which the coils are wound and by the way they are connected up to the circuit the frequency of which is to be measured, a phase displacement of 180° between the fields can be produced by simply interchanging the connections of one of the fixed coils.

Experiments have shown that when the arrangement illustrated in Fig. 4 is used to measure the frequency of damped oscillations, as produced for instance by means of spark discharges, the values obtained are very inaccurate as compared with the true values of the wave lengths. The cause of this inaccuracy is that the condenser, the self inductions of the coils $a$ and $b$ and the self induction outside the instrument which serves for connecting purposes form together an oscillation circuit wherein free oscillations are indured these free oscillations having generally a different frequency from that which is to be determined. If the instrument is calibrated by means of undamped oscillations an error is continuously made when measuring the frequency of damped oscillations, this error being the greater the stronger the damping of the oscillation and being also dependent upon the manner of connecting the instrument with the circuit the frequency of which is to be determined since the frequency of the free oscillation is a function of the connection.

In order to overcome the drawback just referred to the free oscillation of the instrument is strongly damped and even made completely aperiodic. This may be effected by inserting an ohmic resistance in parallel or in series with the condenser or by entirely dispensing with the latter. If for instance the condenser shown in Fig. 4 is replaced by an ohmic resistance the source of the error is removed. The insertion of the resistance is however accompanied by losses of energy which disadvantage may become so great that the instrument could hardly be practically used where small loss of energy is essential as for instance in wireless telegraphy. For example, a wave meter which consumes 50 watts may be said to be unsuitable for high frequency circuits since such an amount of energy would be quite sufficient for signaling over a distance of about 100 kilometers and such a loss could be justified only in very exceptional cases.

The loss of energy may be reduced by making the resistance to be inserted in the circuit of the coil $a$ very small. With such an arrangement however the ratio between the currents flowing through the fixed coils varies but very little with the frequency and the divisions upon the scale corresponding to the various frequencies are too close together. This disadvantage is overcome by the arrangement illustrated in Fig. 6 in which a resistance $k$ is arranged in series with the fixed coil $a$ and a resistance $l$ in parallel with the fixed coil $b$. Theory and experiment have shown that by these means a graduated scale can be obtained in which the divisions are wide apart, in spite of the fact that the watt consumption is substantially decreased, another advantage obtained by the arrangement illustrated in Fig. 6 being that with suitable electric constants the divisions of the graduated scale can in this case be made substantially equal to one another, that is to say the deviations can be made proportional to the wave lengths.

With regard to the phase of the fields of the two fixed coils, it is to be pointed out that it is impossible to obtain with the arrangement shown in Fig. 6 a displacement of 180° or one of 0°, the phase angle lying either between 0 and 90° or between 90 and 180° without however reaching the outermost limits. The "floating" phenomenon hereinbefore referred to is also to be observed although to a less extent in the arrangement shown in Fig. 6. It is advisable to lead the currents to the fixed coils $a$ and $b$ in such a manner that the phase displacement of the fields is made as great as possible, that is to say between 90 and 180°. If the connections with one of the coils are interchanged it can immediately be noticed that the directive force is considerably reduced and that the moving part has then the tendency to "float." It is also to be pointed out that the "floating" phenomenon can only occur when the armature has a well defined circuit which reaches into the fields of the two fixed coils. If for instance the armature is made in the form of a semi-circular solid disk as shown in Fig. 7 each one of the fixed coils will induce in the movable part mainly separate currents. As can however be easily understood and as experiment shows this form of construction is for other reasons disadvantageous. The short-circuited eddy currents induced by each separate coil flow within each field radially toward the axis of the instrument and then back to the periphery of the disk with substantially the same strength so that the forces compensate one another to a great extent, only a small difference being left to effect the turning of the movable part. The use of a well defined circuit which is as free as possible from eddy currents and is under the influence of two fields oscillating in the proper phase has been found to be an important requirement for the success of the instrument. It is also to be noted, that if the instrument is constructed as above referred to no current or hardly any current will flow through the armature after the same has reached its position of equilibrium. In the arrangement illustrated in Fig. 4 no current whatever will flow through the armature, when the fields oscillate with a phase displacement of 180° and in the arrangement illustrated in Fig. 6 wherein this limit can never be attained the current flowing through the armature can be made very small if the current is supplied to the fixed coils in the proper manner as above referred to. In order to attain the required sensitiveness the movable part of measuring instruments used in connection with high frequency currents has to be made very light and for this reason it is desirable to reduce the current in the armature as much as possible so as to prevent overheating.

Fig. 8 illustrates a modified form of construction which is still more sensitive and the scale of which has a wider range. In this form of construction the fixed coils $a$ and $b$ are arranged slightly inclined to the surface of the armature $d$, and the increased sensitiveness and the wider range of scale are due to the fact that the field intensity of the coil toward which the armature moves is smaller than the field intensity of the coil from which the armature moves away. Now since the condition of equilibrium is fulfilled when the electromotive forces induced in the armature by the two coils are equal and opposite to each other the angle of deflection will be greater when the field intensity decreases than when the intensity is constant, the consequence thereof being that with a definite variation of the frequency the arrangement of the inclined coils will give a greater variation of the deviation angle. The angular relation of the coils $a$, $b$ of Fig. 8, and their effective areas are the same as shown in Figs. 5, 6, and 7, that is to say, these coils are located diametrically opposite each other, and each is semicircular.

Referring now to the form of the movable armature it is desirable to reduce the weight of the same as much as possible and I have found that a sheet of aluminum 0.05 to 0.3 millimeters thick answers this purpose very well.

I have just pointed out that it is desirable to increase the sensitiveness of the instrument by making the movable part of a thin sheet of aluminium. This mode of construction however has the disadvantage that the part $m$ (see Fig. 9) of the armature is liable to bend. In order to avoid this drawback the sheet is formed with a rib as shown on an enlarged scale in Fig. 10, and an insulated reinforced arm $n$ is provided between the parts $o$ and $m$ of the armature, as shown in Fig. 9. Instead of forming the sheet with a rib, as shown in the drawing the same may be T-shaped or be bent into a tubular form or be reinforced in any other suitable way. The reinforcement of the armature is more especially required in the case where the armature has a surface angularly greater than that of the fixed coils, which construction I have found increases the sensitiveness of the instrument for instance if the surface of the armature is increased by 15° on each side (see Fig. 11) the resistance in series with the coil $a$ can be reduced by half without in any way affecting the range of the scale. In the arrangements hereinbefore referred to the fixed coils, $a$ and $b$ serve for the purpose of inducing a current in the movable armature $d$ and also for the purpose of producing together with the induced current the turning force which acts upon the armature. According to a modification of the invention these two functions are separated and fulfilled by separate coils. A form of construction embodying this feature is illustrated in Figs. 12 to 14. The coils $a$ and $b$ are semi-circular as in the construction hereinbefore referred to and induce a current in the armature. They do not however exert any or any appreciable mechanical force upon the same since the portions $r^1$ $r^2$ of the armature are substantially removed from the proximity of said coils. In addition to the latter coils I provide coils A and B which I arrange in the proximity of the portions $r^1$ $r^2$ of the armature. These coils are intended to produce fields as uniform as possible which exert a torque upon the portions $r^1$ $r^2$ and they may be made semi-circular but preferably completely circular so that they shall not induce any currents in the armature. Fig. 16 is a diagrammatic plan view indicating circular superposed coils A, B, and semicircular coils $a$, $b$ arranged as in the constructions described above. With such an arrangement the energy consumed by the instrument can be substantially reduced and the sensitiveness increased since the numbers of the windings of the coils A and B may be considerably increased without in any way increasing the watt consumption. In the case of high frequency currents it is advantageous to form the coils of cord wires that is to say, of cables having a plurality of wire strands.

The instrument forming the subject matter of the present invention may also be used as a relay or like controlling device. In this case the conducting pointer $f'$ connected with the movable armature is arranged to abut against the fixed contacts when overstepping or falling short of a predetermined frequency. The pivot of the movable armature being mounted in bearings made of insulating material, it is necessary to provide suitable means for closing a circuit when the predetermined frequency is overstepped. This may be secured for instance by means of double contacts, as shown in Fig. 15 at $s$, $s'$, and $t$, $t'$ respectively.

It will be seen by reference to the drawings, say Fig. 1, that the armature of my improved instrument is so shaped that of all the planes passing through the axis of the instrument ($c$ in Fig. 1) only one divides the armature into two symmetrical parts. Thus in Fig. 1, the axial plane bisecting the angle of the frame $e$ is the only axial plane relatively to which the armature $d$ is symmetrical, and all other planes passing through the axis $c$ will divide the armature $d$ into two unequal parts.

I claim as my invention:

1. An instrument for measuring or checking the frequency or wave length of alternating currents, comprising in combination a pivot, a movable armature having a semicircular portion, a U-shaped portion projecting on one side of said semi-circular portion and another U-shaped portion projecting on the other side of the semi-circular portion, two fixed coils arranged in the proximity of the semi-circular portion of the movable armature, two fixed coils arranged in the proximity of the middle parts of the U-shaped portions of the movable armature, an index mounted on the pivot and a graduated scale, whereby the fixed coils arranged in the proximity of the semi-circular portion of the movable armature induce a current in the latter and this current together with the field of the coils arranged in the proximity of the middle parts of the U-shaped portion produce a torque which causes the rotation of the movable armature, as set forth.

2. An instrument for measuring or checking the frequency or wave length of alternating currents, comprising fixed coils and a movable armature influenced inductively by said coils and so arranged that only one of the planes passing through the axis of the instrument will divide the armature into two symmetrical parts when the same occupies a definite position, all other axial planes dividing it into unequal parts, the surface of the movable armature as well as the surface of each of the fixed coils through which the lines of force pass, being greater than 90°, measured angularly relatively to the axis of the instrument.

3. An instrument for measuring or checking the frequency or wave length of alternating currents, comprising fixed coils and a movable armature influenced inductively by said coils and so arranged that only one of the planes passing through the axis of the instrument will divide the armature into two symmetrical parts when the same occupies a definite position, all other axial planes dividing it into unequal parts, the surface of each of the fixed coils through which the lines of force pass, being about 180° wide, measured angularly relatively to the axis of the instrument.

In testimony whereof I have signed this specification in the presence of two subscribing witnesses.

GEORG SEIBT.

Witnesses:
ARTHUR SCHNEIDTER,
MARTHA KULLER.